(12) United States Patent
Noda

(10) Patent No.: US 6,201,636 B1
(45) Date of Patent: Mar. 13, 2001

(54) GAIN CONTROL UNIT AND OPTICAL AMPLIFIER HAVING TEMPERATURE COMPENSATING FUNCTION

(75) Inventor: Hideki Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/475,078

(22) Filed: Dec. 30, 1999

(30) Foreign Application Priority Data

May 26, 1999 (JP) ............................................. 11-146693

(51) Int. Cl.[7] .............................. H04B 10/18; H01S 3/19; G02B 6/34
(52) U.S. Cl. ........................... 359/337; 359/161; 359/179; 359/341; 385/37
(58) Field of Search ..................................... 359/161, 179, 359/337, 341, 568, 573; 372/34; 385/37

(56) References Cited

U.S. PATENT DOCUMENTS

| | | | |
|---|---|---|---|
| 5,430,817 | * 7/1995 | Vengsarkar | 385/37 |
| 5,541,766 | 7/1996 | Mizrahi et al. | |
| 5,703,978 | * 12/1997 | DiGiovanni et al. | 385/37 |
| 5,764,829 | * 6/1998 | Judkins et al. | 385/37 |
| 5,875,203 | * 2/1999 | Wagener et al. | 372/6 |
| 5,900,970 | * 5/1999 | Kakui | 359/341 |
| 6,049,414 | * 4/2000 | Espindola et al. | 359/337 |

FOREIGN PATENT DOCUMENTS 9-145941   6/1997  (JP) .

OTHER PUBLICATIONS

Llang et al, OFC '98, OSA Tech. Digest, vol. 2, pp. 138–9; Abstract Only Herewith, Feb. 27, 1998.*
Espindala et al, Conf. Proc., LEOS, vol. 1, pp. 255–256, Abst. Only Herewith, Dec. 4, 1998.*

* cited by examiner

*Primary Examiner*—Nelson Moskowitz
(74) *Attorney, Agent, or Firm*—Staas & Halsey LLP

(57) ABSTRACT

A stabilized gain temperature compensated optical amplifier having automatic gain control and automatic level control. An optical amplifier with a temperature dependent gain wavelength characteristic is disposed along an optical transmission line and compensated with a temperature sensitive gain controller cascade connected with the temperature sensitive optical amplifier. The temperature sensitive gain controller has a temperature sensitive loss wavelength characteristic which complements the temperature sensitivity of the amplifier gain wavelength characteristic. The gain controller includes a plurality of grating portions provided with mutually different loss wavelength characteristics, the loss wavelength characteristics having mutually different temperature dependencies. An automatic gain control, independent of the gain controller maintains the gain of the temperature sensitive optical amplifier at a constant level. An automatic level control controls a variable optical attenuator to maintain the power output of the compensated optical amplifier at a constant power output.

13 Claims, 16 Drawing Sheets

OPTICAL AMP CHARACTERISTIC

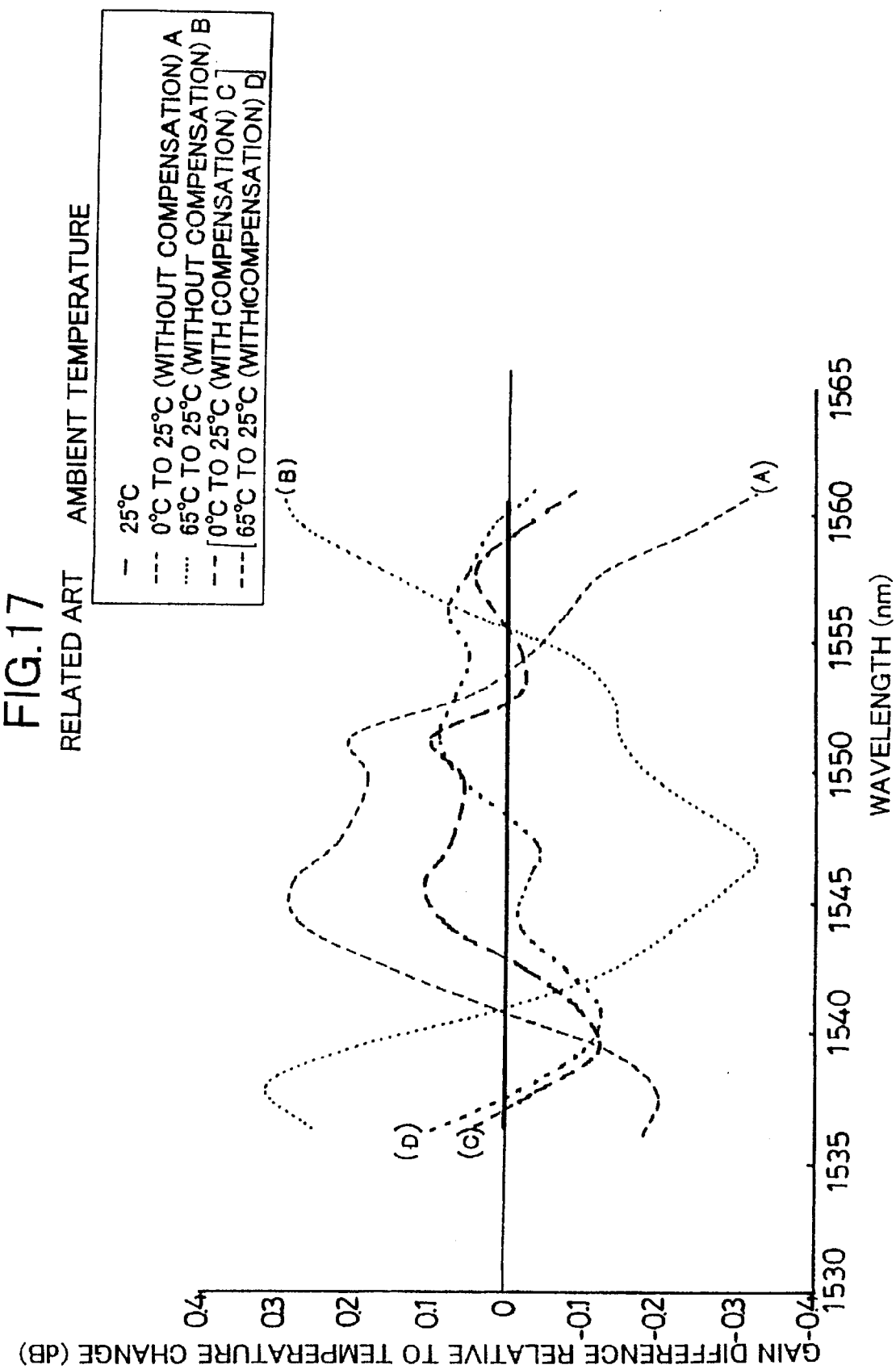

GAIN CONTROL UNIT AND OPTICAL AMPLIFIER HAVING TEMPERATURE COMPENSATING FUNCTION

BACKGROUND OF THE INVENTION (1) Field of the Invention

The present invention relates to a gain control unit and an optical amplifier for compensating a gain wavelength characteristic for an optical signal, and more particularly to a gain control unit and an optical amplifier having a temperature compensating function which also compensates automatically a temperature dependency of the gain wavelength characteristic.

(2) Description of the Related Art

There has been conventionally known a gain equalizer (gain control unit) utilizing such as an optical filter which is provided within an optical amplifier to be used in an optical communication system, to compensate a gain wavelength characteristic of the optical amplifier. This conventional gain equalizer is designed in advance such that its loss wavelength characteristic compensates the gain wavelength characteristic of the optical amplifier to thereby obtain an overall flat wavelength characteristic. Generally, the design of loss wavelength characteristic of the gain equalizer is mostly optimized on the basis of the gain wavelength characteristic of the optical amplifier at a specific temperature. As such, it has been required that the temperature dependency of the loss wavelength characteristic of the gain equalizer is less. By adopting such a gain equalizer, it has become possible to realize an optical amplifier having a relatively flat gain wavelength characteristic in a predetermined wavelength band.

Meanwhile, it is known that a gain wavelength characteristic of an optical amplifier fluctuates depending on ambient temperature. For example, Erbium-doped fiber (EDF) typically used in an optical amplifier has such a gain wavelength characteristic as shown in FIG. 16, in which the gain deviation relative to the wavelength varies largely depending on the ambient temperature (0° C., 25° C., and 65° C., in this figure). Further, the difference between the gain at the ambient temperature of 0° C. and that at the ambient temperature 25° C. in the above mentioned EDF exhibits such a wavelength characteristic (A) as shown in FIG. 17, and the difference between the gain at the ambient temperature 65° C. and that at the ambient temperature 25° C. exhibits a wavelength characteristic (B) in FIG. 17.

Since a gain wavelength characteristic of an EDF has a temperature dependency as noted above, it has been conventionally required to keep the EDF at a constant temperature. As such, it has been required to cover the EDF such as by a heat insulating material, and occasionally to adjust the temperature of the EDF by a heater or power source and the like, causing a disadvantage of increase in size of an optical amplifier.

Relatedly, there exists a technique such as disclosed in Japanese Unexamined Patent Publication 9-145941, as a long period fiber grating ("LPG", which can be used to flatten a gain wavelength characteristic of EDF) aiming at improving stability against temperature variation. In this technique, there are newly designed a profile of cladding and a composition of fiber, in view of the fact that the refractive indices of core and cladding vary differently from each other relative to temperatures due to a temperature dependency of a long period fiber grating. Contrary, as described later herein, the present invention resides in a technique for realizing temperature compensation by appropriately combining fiber gratings having mutually different characteristics, in which the structures of the fiber gratings are common in themselves. Thus, the present invention is distinguished from the aforementioned known technique.

SUMMARY OF THE INVENTION

The present invention has been carried out in view of the conventional problems as described above, and it is therefore an object of the present invention to provide a gain control unit having a temperature compensating function capable of flexibly coping even with a gain wavelength characteristic which fluctuates depending on ambient temperature, to thereby provide an optical amplifier, of small size and simple constitution, capable of realizing a gain wavelength characteristic which is stable over a wide temperature range.

To this end, the present invention provides a gain control unit having a temperature compensating function, comprising: a plurality of grating portions provided in an optical transmission line through which an optical signal is propagated; wherein the plurality of grating portions have mutually different loss wavelength characteristics, and the mutually different loss wavelength characteristics have mutually different temperature dependencies.

According to such a constitution, it becomes possible to design freely a gain control unit in which a loss wavelength characteristic thereof fluctuates depending on ambient temperature change, by appropriately combining a plurality of grating portions constituted such that loss wavelength characteristics thereof are mutually different and the respective loss wavelength characteristics have temperature dependencies, to be used as an optical transmission line.

The present invention also provides an optical amplifier having a temperature compensating function, in which the optical amplifier includes an optical amplifying device for amplifying an optical signal to be propagated through an optical transmission line, and the optical amplifying device has a gain wavelength characteristic having a temperature dependency, the optical amplifier comprising: a plurality of grating portions provided within the optical amplifying device or on the optical transmission line connected to the optical amplifying device, wherein the plurality of grating portions have mutually different loss wavelength characteristics, and the mutually different loss wavelength characteristics have mutually different temperature dependencies; and wherein the loss wavelength characteristics of the grating portions and the temperature dependencies of the loss wavelength characteristics are set corresponding to the gain wavelength characteristic of the optical amplifying device and the temperature dependency of the gain wavelength characteristic of the optical amplifying device, respectively.

In such a constitution, an optical signal is amplified in the optical amplifying device corresponding to the gain wavelength characteristic having the temperature dependency. Nonetheless, there is automatically performed a gain compensation including the temperature characteristic since the optical signal is propagated through the plurality of grating portions in which the loss wavelength characteristics thereof and the temperature dependencies of the loss wavelength characteristics are set corresponding to the gain wavelength characteristic of the optical amplifying device and the temperature dependency of the gain wavelength characteristic of the optical amplifying device. In this way, it becomes possible to realize an optical amplifier, of small size and simple constitution, capable of obtaining a gain wavelength characteristic which is stable irrespectively of a temperature change.

For the gain control unit or the optical amplifier mentioned above, the plurality of grating portions may be long period fiber gratings which are formed along the optical transmission line, respectively. The long period fiber gratings preferably have respective grating pitches in a range of from 0.1 mm to 1 mm.

Further, for the optical amplifier, the optical amplifying device may be concretely a multistage amplification constitution having a plurality of optical amplifying portions, and the optical amplifying device may include an optical fiber amplifier adopting a rare earth element doped fiber.

Further objects, features and advantages of the present invention will become more apparent from the following description of the preferred embodiments when read in conjunction with the accompanying drawings.

BRIEF DESCRIPTION OF THE DRAWINGS

FIG. 17 is a diagram showing gain differences relative to a temperature change of the optical amplifier in FIG. 16.

DETAILED DESCRIPTION OF THE PREFERRED EMBODIMENT

There will be described hereinafter the embodiments according to the present invention, with reference to the accompanying drawings.

Figure 1:
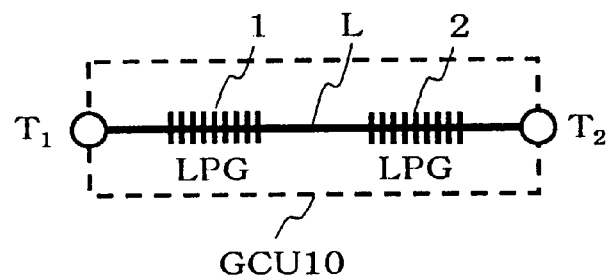
FIG. 1 is a view showing a constitution of a gain control unit to be used in a first embodiment of the present invention.
Figure 2:
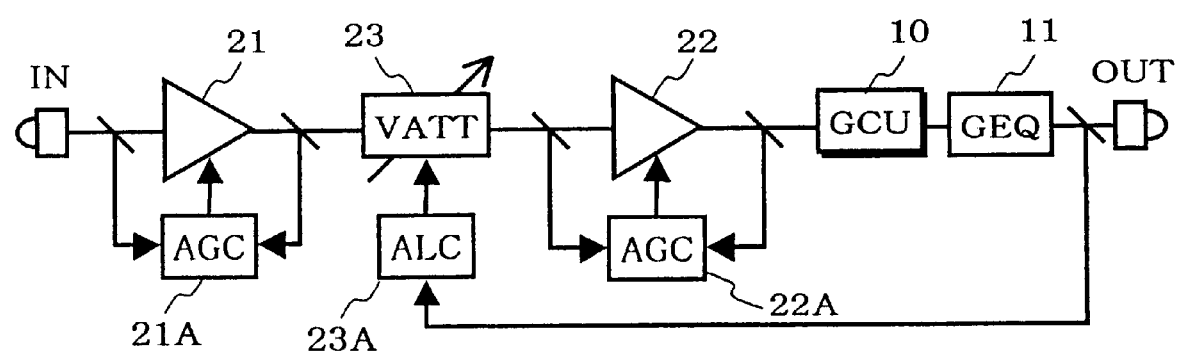
FIG. 2 is a block diagram showing a constitution of an optical amplifier of the first embodiment.

FIG. 1 is a view showing a constitution of a gain control unit to be used in an optical amplifier according to a first embodiment of the present invention. FIG. 2 is a block diagram showing an example of constitution of the optical amplifier.

In FIG. 1, a gain control unit (GCU)10 to be used in this embodiment constitutes an optical transmission line L, by cascading for example two kinds of long period gratings (hereinafter called "LPG") 1, 2 between terminals $T_1$ and $T_2$.

For the LPG's 1 and 2, there is adopted LPG having such constitutions that loss wavelength characteristics thereof are mutually different relative to an optical signal propagated through the optical transmission line L, and the respective loss wavelength characteristics have mutually different temperature dependencies. Each of these LPG's 1 and 2 has a constitution identical with that of a known LPG, and is fabricated by inscribing a grating having a necessary grating pitch along a longitudinal direction of an optical fiber, such as by irradiating ultraviolet rays from the exterior of the optical fiber. The grating pitch of LPG is typically in the order of 0.5 mm (in a range from 0.1 mm to 1 mm). This grating pitch is for a long period since it is wider than a grating pitch (typically in an order of 0.5 $\mu$m) of a fiber Bragg grating (FBG). The LPG's 1 and 2 may be mutually connected such as via optical connector or by a splice to each other. Alternatively, it is also possible to separately inscribe the two LPG's 1 and 2 in a longitudinal direction of one optical fiber, and to connect the thus prepared optical fiber between the terminals $T_1$ and $T_2$. The setting of the loss wavelength characteristics of the LPG's 1 and 2 will be described later.

It is possible to constitute an optical amplifier adopting the gain control unit10 having the above described constitution as shown in FIG. 2, such that an optical amplifying portion 21 of former stage and an optical amplifying portion 22 of latter stage are cascaded via a variable optical attenuator (VATT) 23 between an input port IN and an output port OUT, and further, the gain control unit 10 and a gain equalizer (GEQ) 11 are inserted between the optical amplifying portion 22 of latter stage and the output port OUT.

For example, the optical amplifying portions 21 and 22 are capable of collectively amplifying wavelength-division multiplexed (WDM) signal light containing a plurality of optical signals of different wavelengths, and concretely, are constituted of known optical amplifying devices such as Erbium doped fiber amplifier (EDFA). The optical amplifying portions 21 and 22 are provided with AGC circuits 21A and 22A, respectively, for controlling gain to be constant. Each of the AGC circuits monitors the powers of input light and output light of the corresponding optical amplifying portion, to thereby automatically control such as a power of excitation light so that the gain at the corresponding optical amplifying portion reaches a predetermined value. By controlling the gains of the optical amplifying portions 21 and 22 to be constant, it becomes possible to keep the gain wavelength characteristics of the optical amplifying portions 21 and 22 constant against fluctuation of input light level.

The variable optical attenuator 23 is a known optical attenuator capable of varying an amount of light attenuation based on a signal from the outside. The amount of light attenuation of this variable optical attenuator 23 is controlled by a signal output from an ALC circuit 23A. This ALC circuit 23A here monitors a power of output light of the gain equalizer 11, to thereby generate a signal for controlling the amount of light attenuation of the variable optical attenuator 23 such that powers of optical signals of respective wavelengths to be output from the optical amplifier reach predetermined levels, respectively. The gain equalizer 11 is an equalizer for adjusting the gain wavelength characteristics of the optical amplifying portions 21 and 22, to thereby fix the gain relative to wavelength.

Although omitted from the depiction in the figure, it is possible to provide a dispersion compensation device such as a dispersion compensation fiber within the present optical amplifier, if it is required to compensate wavelength dispersion to be generated such as within an optical transmission line connected to the ports IN and OUT of the present optical amplifier.

There will be now described the loss wavelength characteristics of the LPG's 1 and 2 and the temperature dependencies of the loss wavelength characteristics, respectively, to be used for the gain control unit 10.

Figure 3:
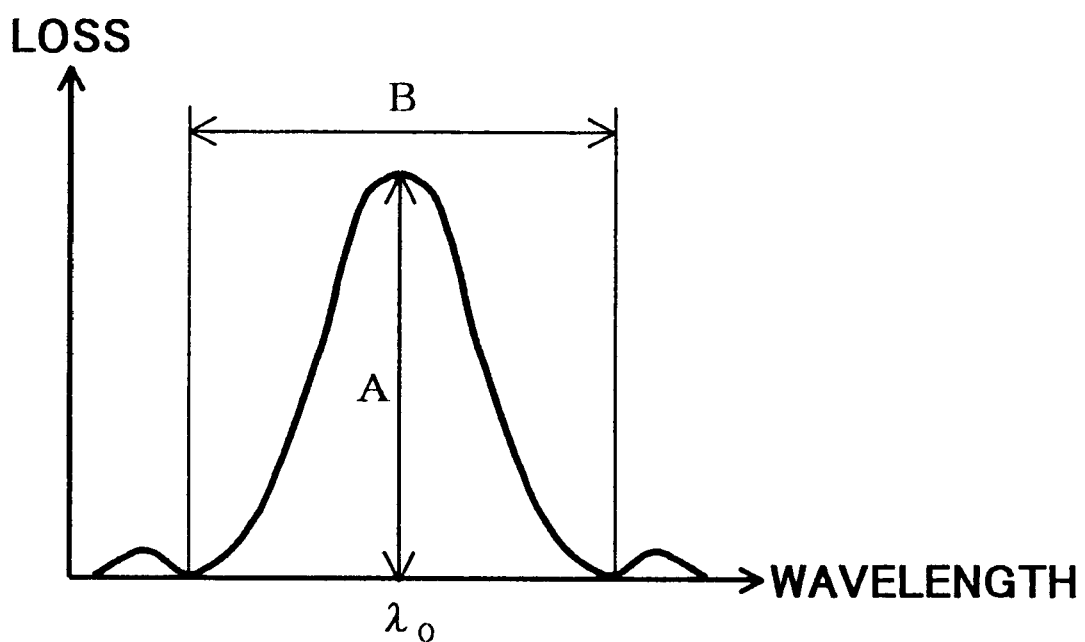
FIG. 3 is an explanatory view of a general loss wavelength characteristic of LPG.

There will be firstly explained general characteristics of an LPG, with reference to FIG. 3.

The loss wavelength characteristic of the LPG shown in FIG. 3 is typically specified by parameters of a central wavelength $\lambda_0$, a maximum loss A, and a wavelength width B in which the loss is generated. The central wavelength $\lambda_0$ and the wavelength width B are determined correspondingly to a grating pitch of a grating to be formed in an optical fiber, while the maximum loss A is determined by a difference between the refractive indices of a core and a cladding and by an inscribed area width of the grating.

Further, the main cause of the phenomenon (wavelength shift) wherein a loss wavelength characteristic of LPG is shifted depending on ambient temperature, resides in temperature dependencies of refractive indices of the core and cladding. For example, it is known that a wavelength shift amount $\Delta\lambda$ per 100° C. is in an order of +5 nm ($\Delta\lambda$~+5 nm/100° C.) when a grating is inscribed into a common dispersion shifted fiber (DSF). This wavelength shift amount $\Delta\lambda$ can be optionally varied in a range in an order of from −(minus)several nm/100° C. to +(plus)10 nm/100° C., by changing doping materials for core and cladding and doping amounts.

Thus, by combining a plurality of LPG's having mutually different wavelength shift amounts due to temperature change, it becomes possible to realize a gain control unit having a loss wavelength characteristic which fluctuates depending on a temperature, and to change patterns not only of the wavelength shift but also of a loss wavelength characteristic into desired shapes.

There will be concretely described hereinafter temperature dependencies of loss wavelength characteristics in case that two LPG's 1 and 2 are combined with each other, with reference to FIGS. 4 through 6.

Figure 4:
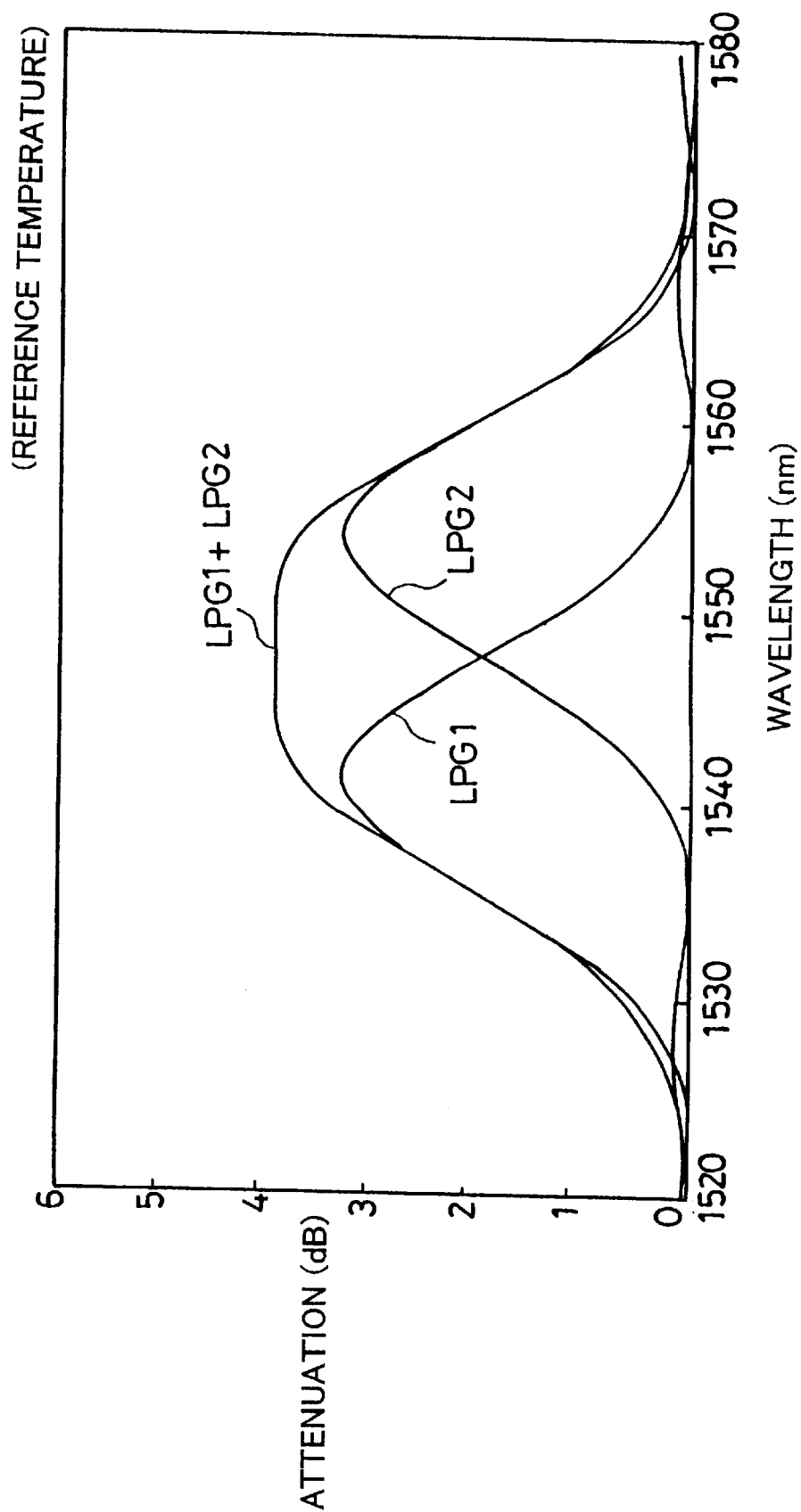
FIG. 4 is a diagram showing individual and combined loss wavelength characteristics of two kinds of LPG's at a reference temperature.

FIG. 4 is a diagram showing an example of individual loss wavelength characteristics of two LPG's 1 and 2, and a combined loss wavelength characteristic in case that LPG's 1 and 2 are connected to each other, all at a reference temperature. The wavelength band is from 1,535 nm to 1,560 nm, and the ordinate in the figure represents a loss amount in dB unit.

In the example of FIG. 4, there are shown the loss wavelength characteristics in case of adopting LPG 1 having a central wavelength $\lambda_0$ near 1,541 nm and LPG 2 having a central wavelength $\lambda_0$ near 1,554 nm. The maximum losses A of both LPG's 1 and 2 are equally about 3 dB, and the wavelength widths B of them are equally about 36 nm. When the LPG's 1 and 2 having such loss wavelength characteristics, respectively, are connected to each other in a manner as shown in FIG. 1, the loss wavelength characteristics of the respective LPG's 1 and 2 are overlapped with each other to thereby provide a loss wavelength characteristic which has a substantially flat loss amount over a central part in a wavelength band from 1,535 nm to 1,560 nm.

Figure 5:
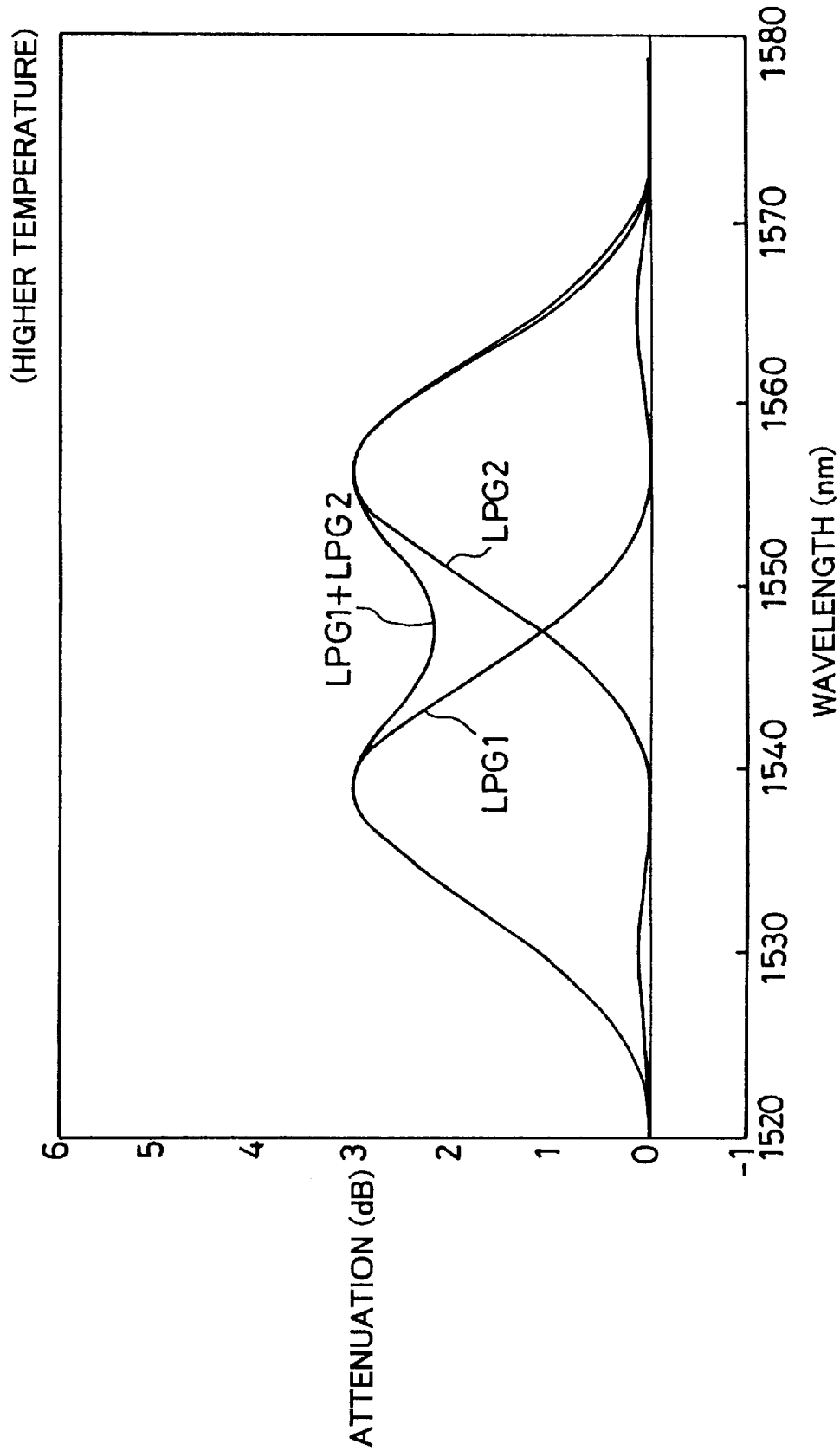
FIG. 5 is a diagram showing an example of loss wavelength characteristic when the ambient temperature is raised in FIG. 4.
Figure 6:
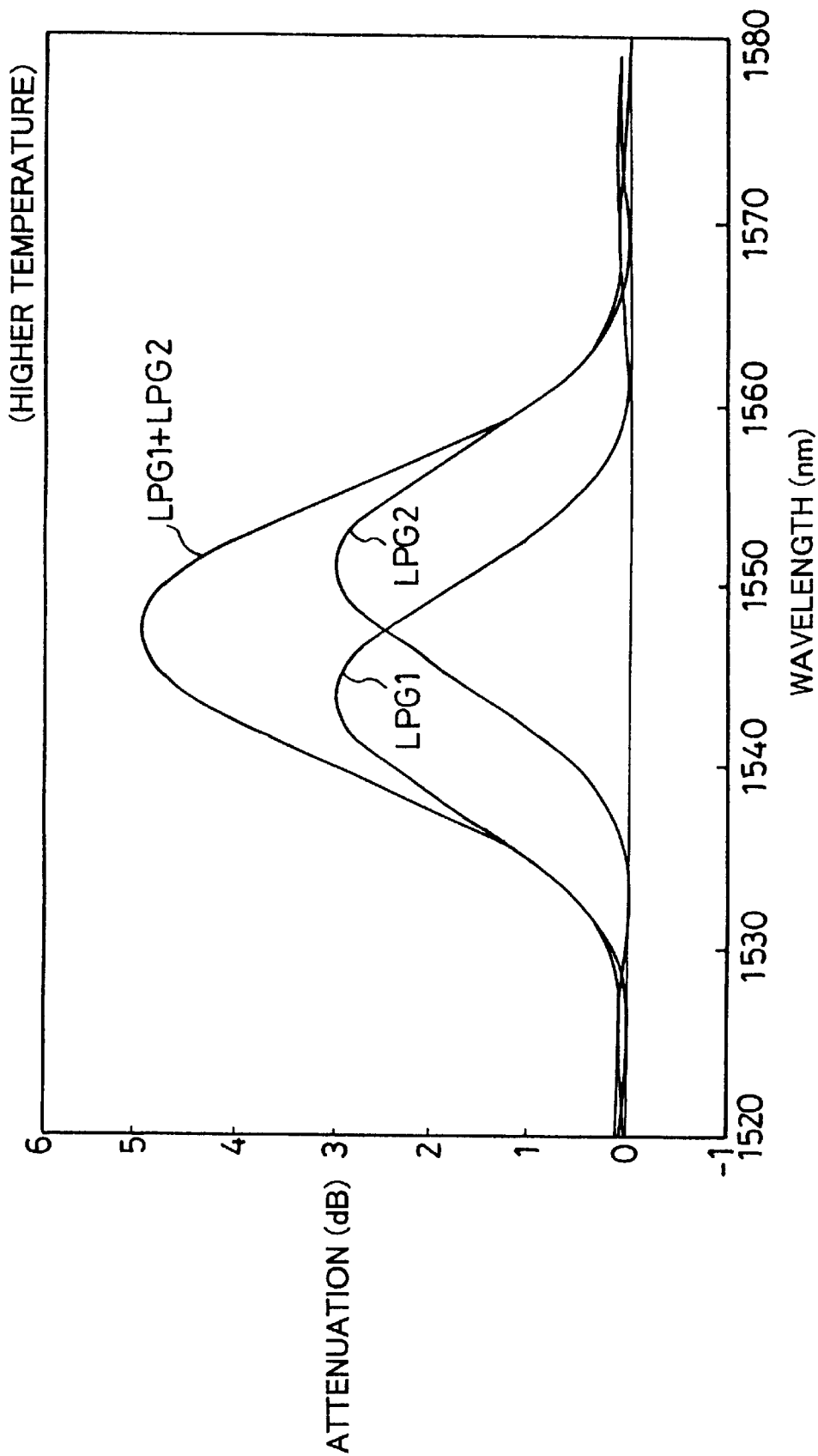
FIG. 6 is a diagram showing another example of loss wavelength characteristic when the ambient temperature is raised in FIG. 4.

Each of FIGS. 5 and 6 shows an example where the ambient temperature is raised for the LPG's 1 and 2 having the aforementioned loss wavelength characteristics, respectively. It is noted that FIG. 5 shows a situation where the LPG 1 has a negative temperature coefficient (wavelength shift) and the LPG 2 has a positive temperature coefficient, relative to a temperature rise, whereas FIG. 6 shows a situation where the LPG 1 has a positive temperature coefficient and the LPG 2 has a negative temperature coefficient, relative to a temperature rise.

In the example of FIG. 5, due to rise of ambient temperature, the central wavelength $\lambda_0$ of LPG 1 has been shifted to the vicinity of 1,539 nm (the wavelength shift amount is approximately −2 nm), and the central wavelength $\lambda_0$ of the LPG 2 has been shifted to the vicinity of 1,556 nm (the wavelength shift amount is approximately +2 nm). When the LPG's 1 and 2 having such characteristics are connected to each other, there is obtained a loss wavelength characteristic having a concave shape at a central part of the wavelength band.

In the example of FIG. 6, due to rise of ambient temperature, the central wavelength $\lambda_0$ of LPG 1 has been shifted to the vicinity of 1,544 nm (the wavelength shift amount is approximately +3 nm), and the central wavelength $\lambda_0$ of the LPG 2 has been shifted to the vicinity of 1,551 nm (the wavelength shift amount is approximately −3 nm). When the LPG's 1 and 2 having such characteristics are connected to each other, there is obtained a loss wavelength characteristic having a convex shape at a central part of the wavelength band.

As described above, it becomes possible to design a gain control unit having a loss wavelength characteristic capable of fluctuating depending on a change in ambient temperature, by combining and connecting properly a plurality of LPG's constituted such that loss wavelength characteristics thereof are mutually different and the respective loss wavelength characteristics have mutually different temperature dependencies. By connecting the two LPG's 1 and 2 with each other herein, it becomes possible to optionally set the concave/convex pattern of the loss amount at the central part of wavelength band, depending on the ambient temperature. In the above examples, there have been described such cases where the maximum losses A and the wavelength widths B of the respective LPG's 1 and 2 are equal to each other, respectively. However, it is easy to make loss wavelength characteristic at the time when the LPG's are connected to each other to be an asymmetric shape, by setting the maximum losses A and the wavelength widths B of the LPG's 1 and 2 separately from each other. In this way, it becomes possible to realize the gain control unit 10 having the temperature compensating function with a simple constitution, thereby excluding the conventional necessity of keeping a temperature of EDF constant, and also to achieve downsizing of an optical amplifier.

In the above examples, there have been considered the LPG's 1 and 2, both of the loss wavelength characteristics of which are shifted relative to a temperature change. However, the present invention is not limited thereto, and it is also possible to adopt such a combination in which only one of the LPG's has a loss wavelength characteristic which is to be shifted relative to a temperature change, and the other has a loss wavelength characteristic which is substantially fixed without shifted. Based on such a combination, there will be considered a gain control unit which is designed correspondingly to the gain wavelength characteristics of the optical amplifying portions 21 and 22.

Figure 16:
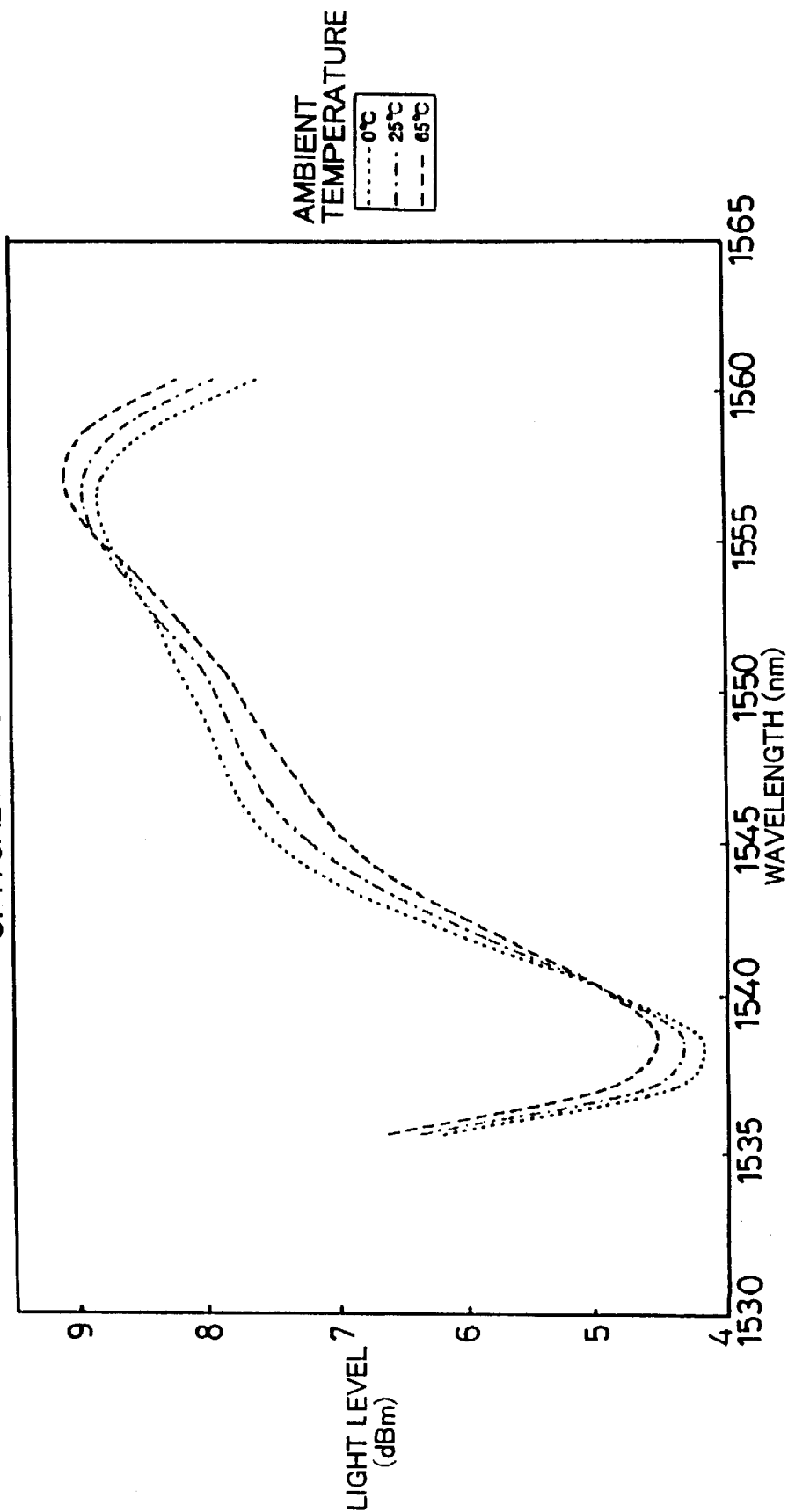
FIG. 16 is a diagram showing an example of a gain wavelength characteristic of an optical amplifier.

It is supposed here that the gain wavelength characteristics of the optical amplifying portions 21 and 22 have temperature dependencies such as shown in the aforementioned FIG. 16.

Figure 7:
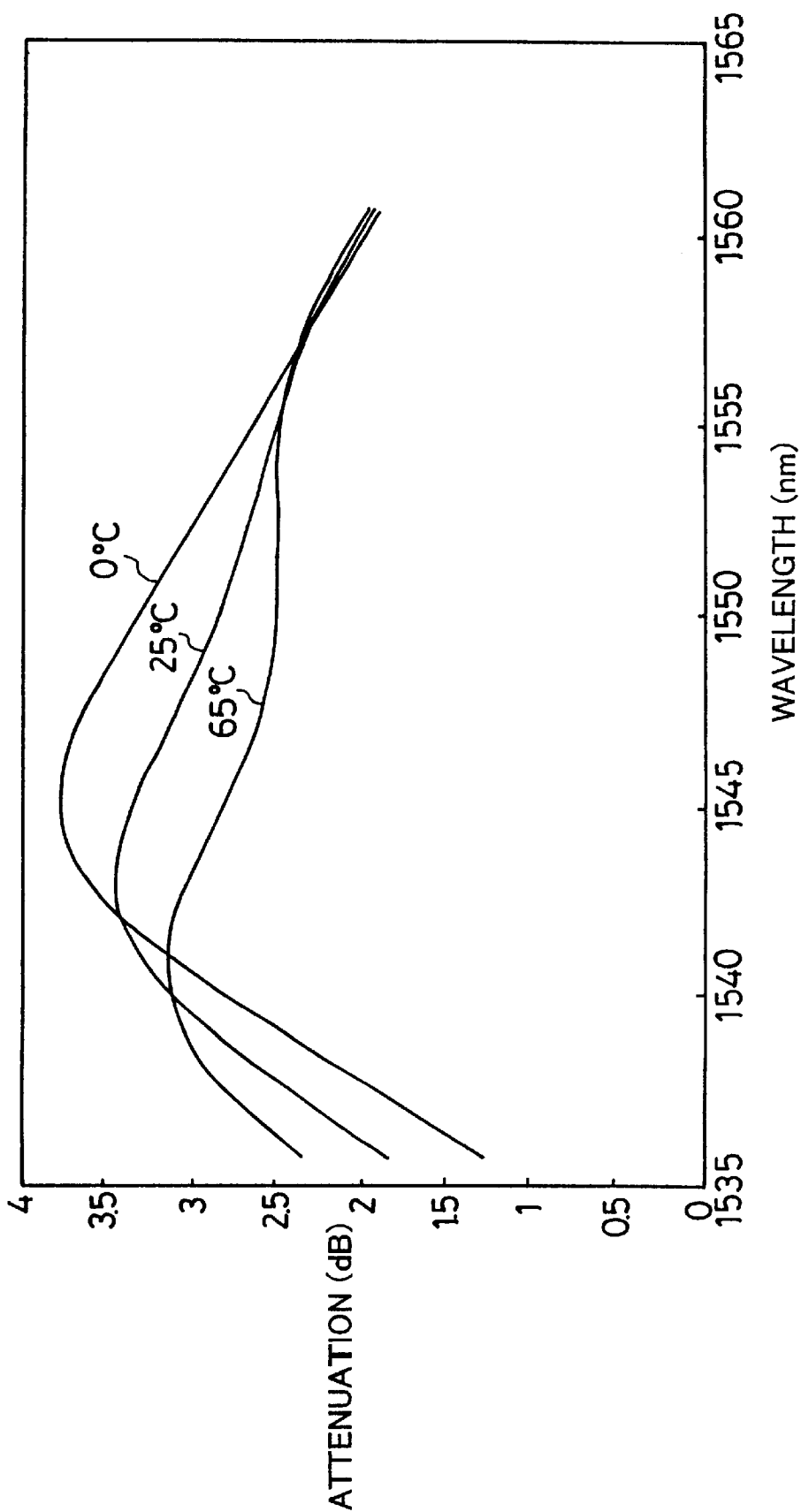
FIG. 7 is a diagram showing temperature characteristics of the gain control unit, in case of fixing a loss wavelength characteristic of the one at a long wavelength side of the two LPG's relative to a temperature change.

FIG. 7 shows an example of a loss wavelength characteristic of the gain control unit 10 which is aimed to be optimized corresponding to the gain wavelength characteristic of FIG. 16. This loss wavelength characteristic corresponds to a situation where the LPG 1 having its central wavelength $\lambda_0$ at a short wavelength side has a loss wavelength characteristic which is to be shifted relative to a temperature change, and the LPG 2 having its central wavelength $\lambda_0$ at a long wavelength side has a fixed loss wavelength characteristic relative to a temperature change.

When the gain control unit 10 having the loss wavelength characteristic relative to a temperature change as shown in FIG. 7 is connected to the optical amplifier shown in the aforementioned FIG. 2, it becomes possible to compensate, at the short wavelength side part and the central part of the wavelength band, the gain wavelength characteristics of the optical amplifying portions 21 and 22 depending on a change in ambient temperature. Thus, it becomes possible to obtain an optical signal having a uniform gain relative to a wavelength. However, there will be caused an error of gain compensation at the long wavelength side part, since the temperature based change of the loss wavelength characteristic of the gain control unit 10 can not fully cope with the temperature based change of the gain wavelength characteristics of the optical amplifying portions 21 and 22.

Figure 8:
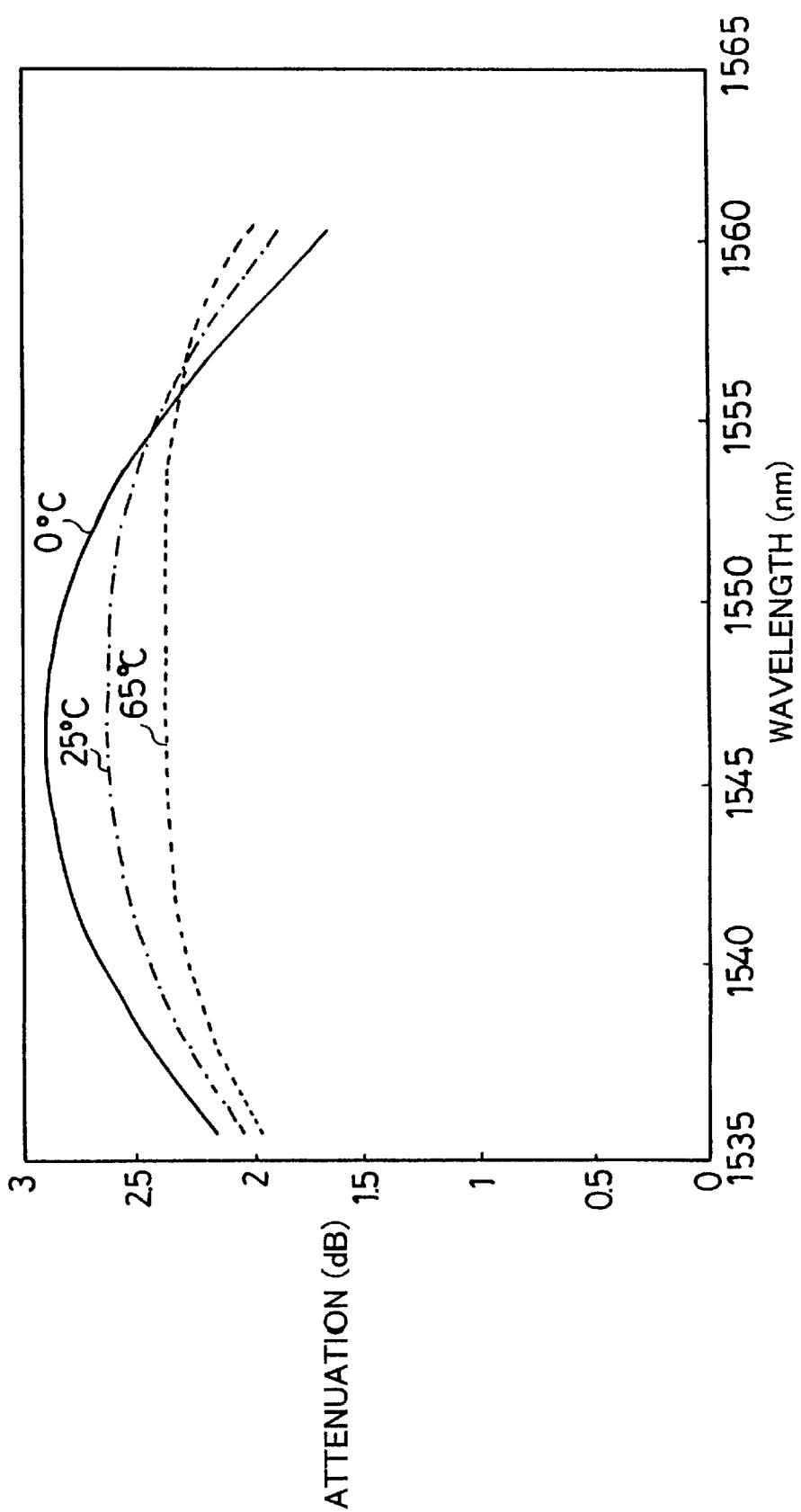
FIG. 8 is a diagram showing temperature characteristics of the gain control unit, in case of fixing a loss wavelength characteristic of the one at a short wavelength side of the two LPG's relative to a temperature change.

FIG. 8 shows another example of a loss wavelength characteristic of the gain control unit 10 which is aimed to be optimized correspondingly to the gain wavelength characteristic of FIG. 16. This loss wavelength characteristic corresponds to a situation where the LPG 1' having its central wavelength $\lambda_0$ at a short wavelength side has a fixed loss wavelength characteristic relative to a temperature change, and the LPG 2' having its central wavelength $\lambda_0$ at a long wavelength side has a loss wavelength characteristic which is to be shifted relative to a temperature change. Note, in a practical measurement, there is used, as LPG 1', the LPG 2 used for obtaining the characteristic in the aforementioned FIG. 7, and there is used, as LPG 2', an LPG 3 which will be used in an embodiment to be described later.

When the gain control unit 10 having the loss wavelength characteristic relative to a temperature change as shown in FIG. 8 is connected to the optical amplifier, it becomes possible to compensate, at the central part and the long wavelength side part of the wavelength band, the gain wavelength characteristics of the optical amplifying portions 21 and 22 depending on a change in ambient temperature. Thus, it becomes possible to obtain an optical signal having a uniform gain relative to a wavelength. However, there will be caused an error of gain compensation at the short wavelength side.

As described above, there exists a limitation to a wavelength band in which the gain wavelength characteristics of the optical amplifying portions 21 and 22 can be compensated, with the gain control unit 10 which is realized such as by combining one LPG having a loss wavelength characteristic which is to be shifted relative to a temperature change, and the other LPG having a fixed loss wavelength characteristic. In order to realize a gain compensation over a relatively wide wavelength band of from 1,535 nm to 1,560 nm such as in this embodiment, it is considered to be necessary to optimally design, for both LPG's 1 and 2, the temperature dependencies of their loss wavelength characteristics, respectively, or to combine three or more LPG's. Nonetheless, it is possible to perform a fully effective gain compensation even by the aforementioned combination of two LPG's, when the wavelength band requiring compensation is relatively narrow.

There will be described hereinafter a second embodiment of the present invention.

In this second embodiment, there will be considered an optical amplifier which is constituted of a gain control unit obtained by combining three LPG's.

Figure 9:
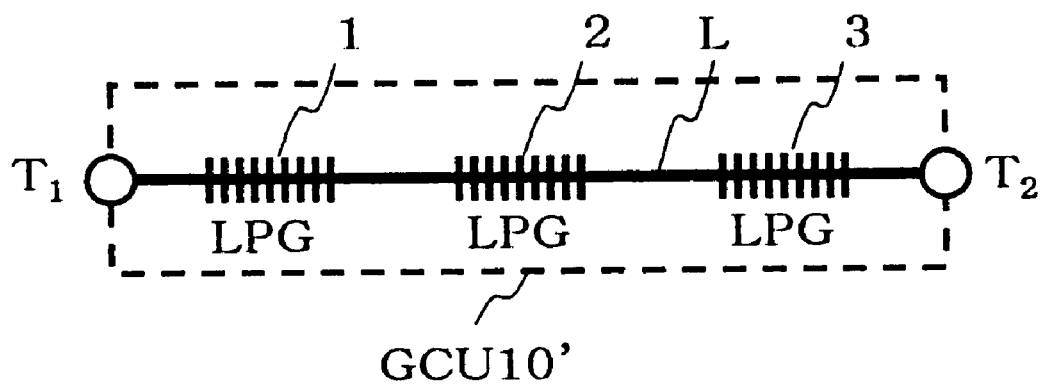
FIG. 9 is a view showing a constitution of a gain control unit to be used in a second embodiment of the present invention.

FIG. 9 is a view showing a constitution of a gain control unit to be used in the second embodiment. The constitution of the optical amplifier to which the gain control unit of FIG. 9 is connected is same as that in FIG. 2, therefore, the description is omitted.

In FIG. 9, the gain control unit 10' constitutes an optical transmission line L, such as by cascading three kinds of LPG's 1, 2 and 3 between terminals $T_1$ and $T_2$.

For the LPG's 1 to 3, there is adopted LPG's having such constitutions that loss wavelength characteristics thereof are mutually different relative to an optical signal propagated through the optical transmission line L, and the respective loss wavelength characteristics have mutually different temperature dependencies. The constitutions of the LPG's 1 to 3 and the connecting manner thereof are identical to those of the first embodiment.

In this case, it is supposed that the central wavelength $\lambda_0$ of LPG 1 is positioned at a short wavelength side, central wavelength $\lambda_0$ of LPG 3 is positioned at a long wavelength side, relative to the wavelength band of from 1,535 nm to 1,560 nm, and the central wavelength $\lambda_0$ of LPG 2 is intermediately positioned between LPG 1 and LPG 3. Relative to the temperature change, there is considered such a setting that the loss wavelength characteristic of LPG 2 is fixed while those of LPG's 1 and 3 are shifted. Further, the gain wavelength characteristics of the optical amplifying portions 21 and 22 are supposed to have the temperature dependencies identical with those shown in the aforementioned FIG. 16.

The setting of the temperature dependencies of the three LPG's 1 to 3 is not limited to the above. The loss wavelength characteristics of LPG 1 and LPG 3 may be fixed relative to a temperature change. Alternatively, all of the loss wavelength characteristics of LPG's 1 to 3 may be respectively shifted relative to a temperature change.

Figure 10:
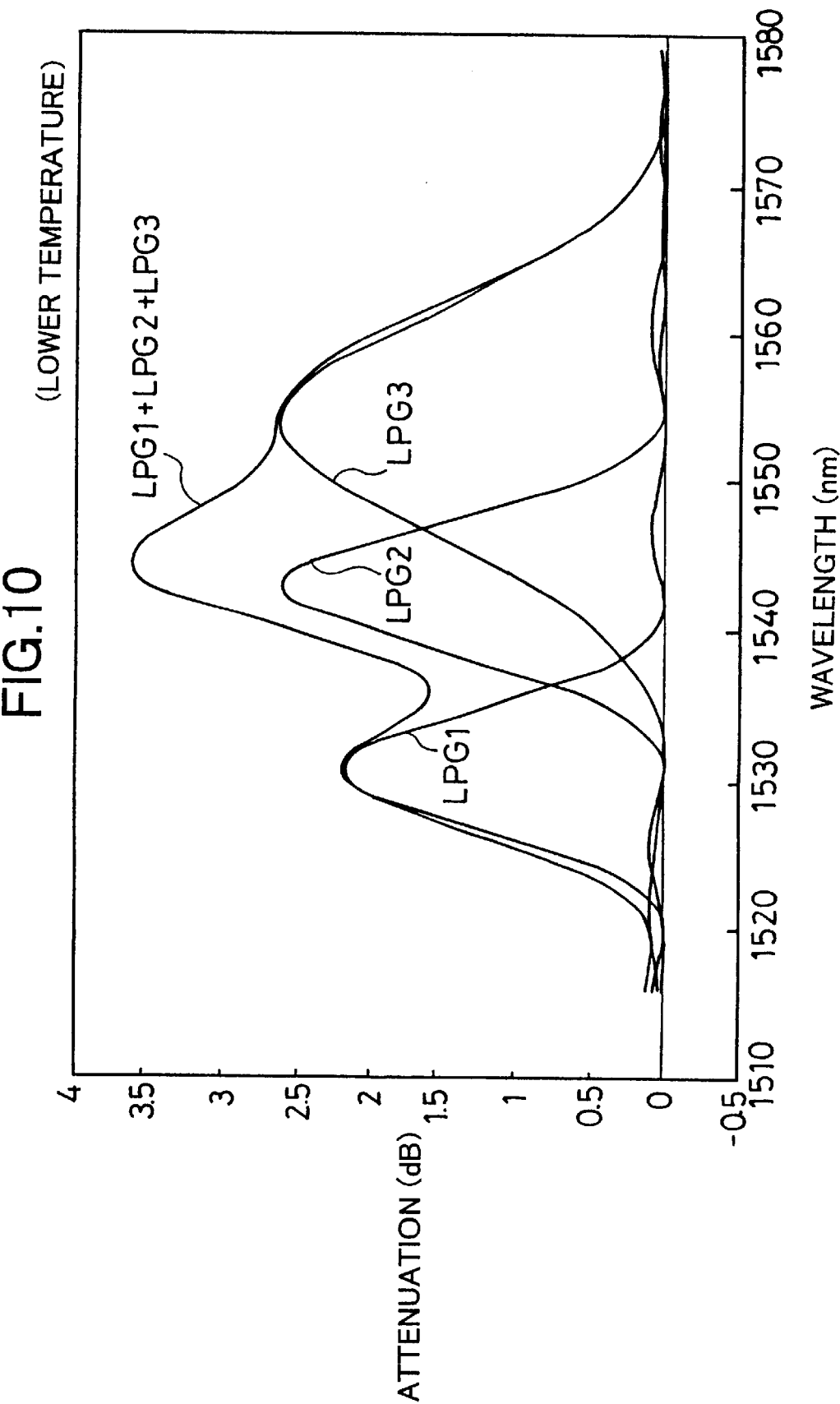
FIG. 10 is a diagram showing a loss wavelength characteristic of the gain control unit of the second embodiment at a lower temperature.
Figure 11:
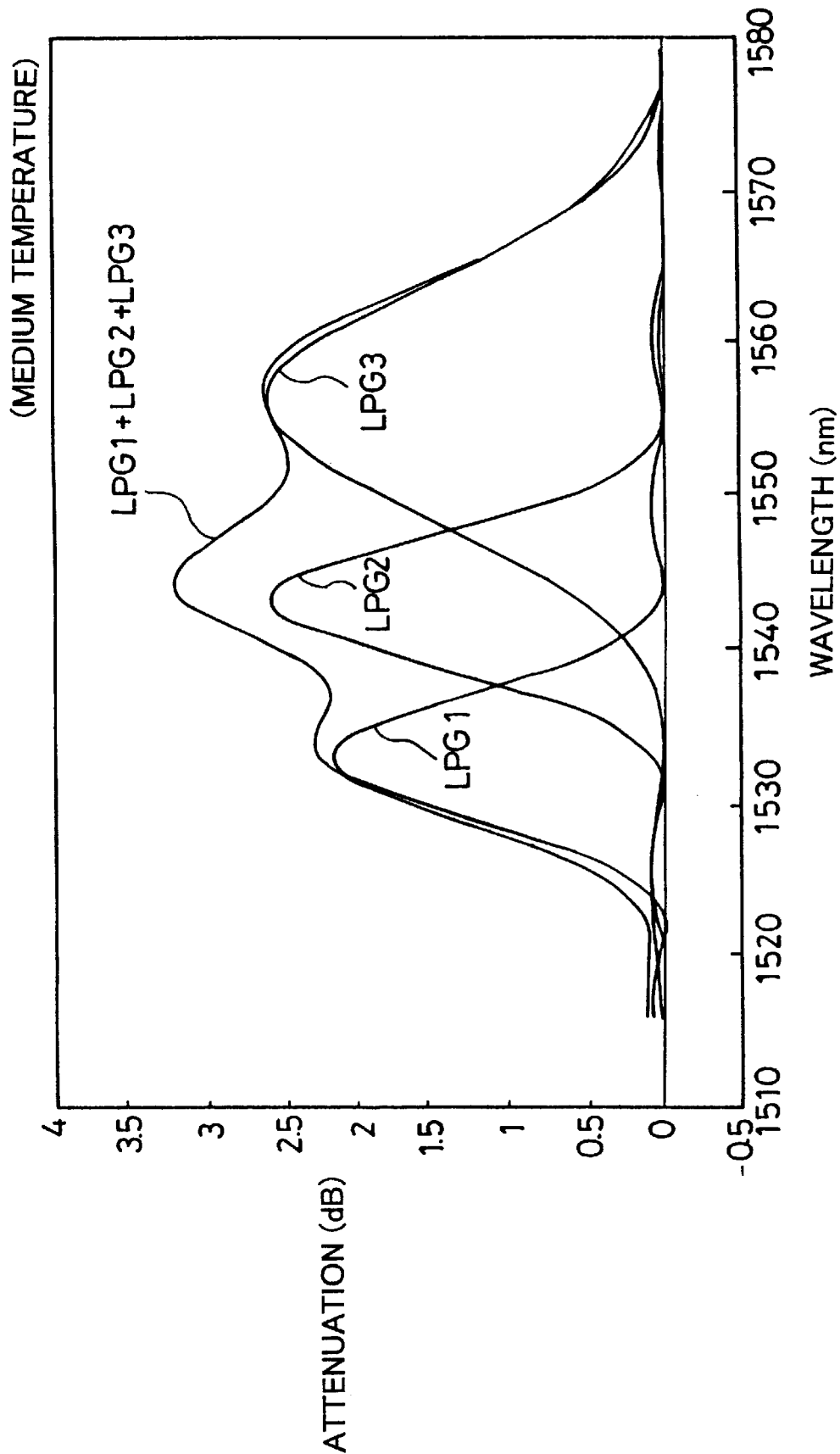
FIG. 11 is a diagram showing a loss wavelength characteristic of the gain control unit of the second embodiment at a medium temperature.
Figure 12:
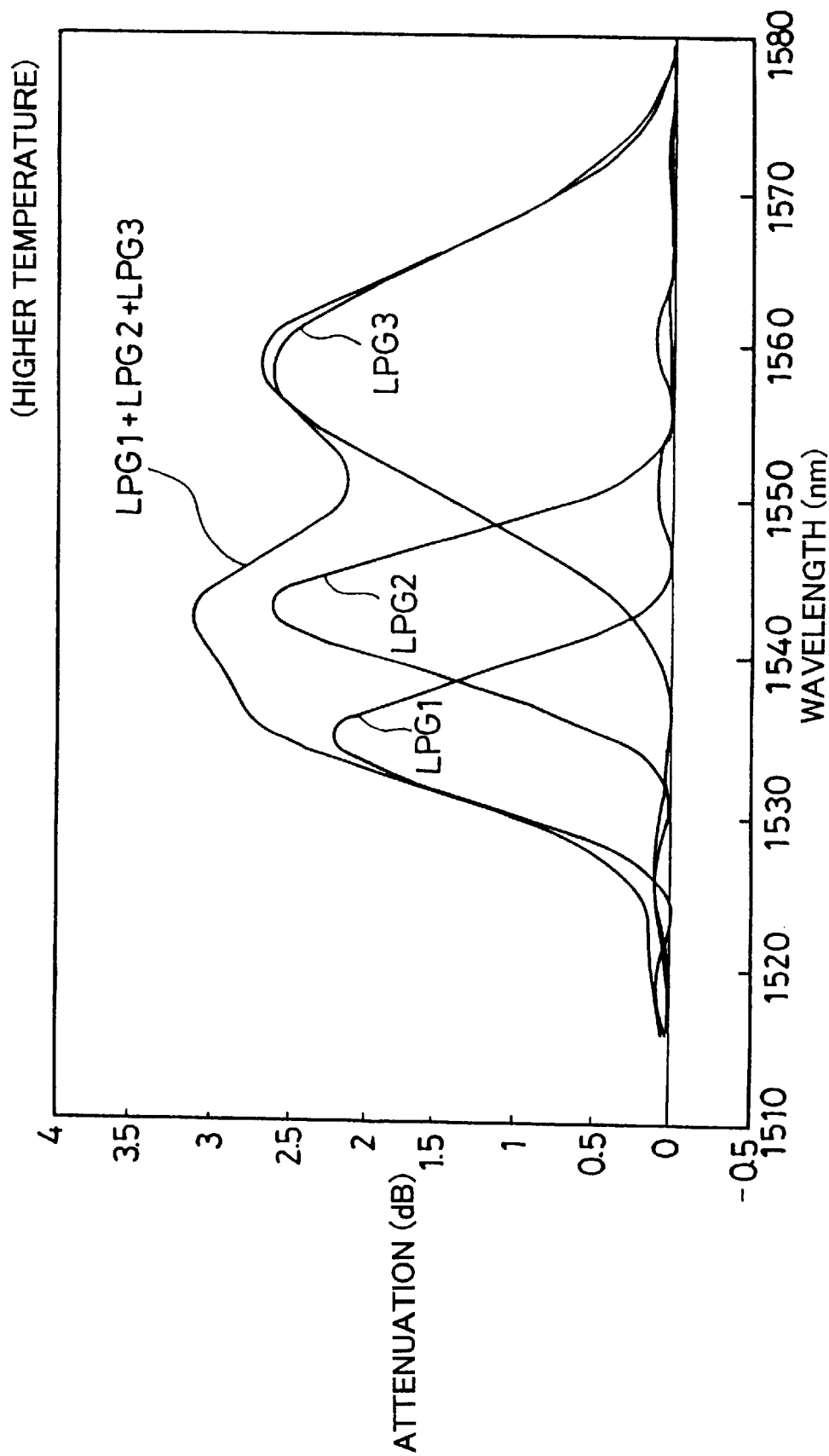
FIG. 12 is a diagram showing a loss wavelength characteristic of the gain control unit of the second embodiment at a higher temperature.

FIGS. 10 to 12 are diagrams showing the individual loss wavelength characteristics of the three LPG's 1 to 3 and the loss wavelength characteristic in case of connecting them to one another, at the respective temperatures. FIGS. 10, 11 and 12 show the characteristics at a lower temperature, a medium temperature and a higher temperature, respectively.

At the respective temperatures in FIGS. 10 to 12, the central wavelength $\lambda_0$ of LPG 2 is fixed at the vicinity of 1,543 nm, while the respective central wavelengths $\lambda_0$ of LPG 1 and LPG 3 are shifted depending on a temperature change. In this case, the LPG 1 and LPG 3 are set to have required positive temperature coefficients, respectively, relative to ambient temperature rise. Further, the maximum losses A and the wavelength widths B of LPG's 1 to 3 are constant relative to a temperature change. Concretely, the maximum loss A and wavelength width B are approximately 2.2 dB and approximately 22 nm for LPG 1, approximately 2.6 dB and approximately 24 nm for LPG 2, and approximately 2.6 dB and approximately 44 nm for LPG 3.

At the medium temperature shown in FIG. 11, the gap between the central wavelengths $\lambda_0$ of LPG 1 and LPG 2 is approximately 10 nm, and the gap between the central wavelengths $\lambda_0$ of LPG 2 and LPG 3 is approximately 13 nm. Considering this characteristic at the medium temperature as a reference, at the lower temperature shown in FIG. 10, the gap between LPG 1 and LPG 2 is widened by 2 nm to become approximately 12 nm, and the gap between LPG 2 and LPG 3 is narrowed by 2 nm to become approximately 11 nm. Further, at the higher temperature shown in FIG. 12, the gap between LPG 1 and LPG 2 is narrowed by 2 nm to become approximately 8 nm, and the gap between LPG 2 and LPG 3 is widened by 2 nm to become approximately 15 nm.

The gain control unit 10' constituted by connecting, in a manner as shown in FIG. 9, the LPG's 1 to 3 having the aforementioned loss wavelength characteristics will have the loss wavelength characteristic as cooperatively shown by the lines LPG 1+LPG 2+LPG 3 in FIGS. 10 to 12.

There will be described hereinafter the characteristic of the optical amplifier, in case that the gain control unit 10' comprising the three LPG's 1 to 3 is provided in this optical amplifier.

Figure 13:
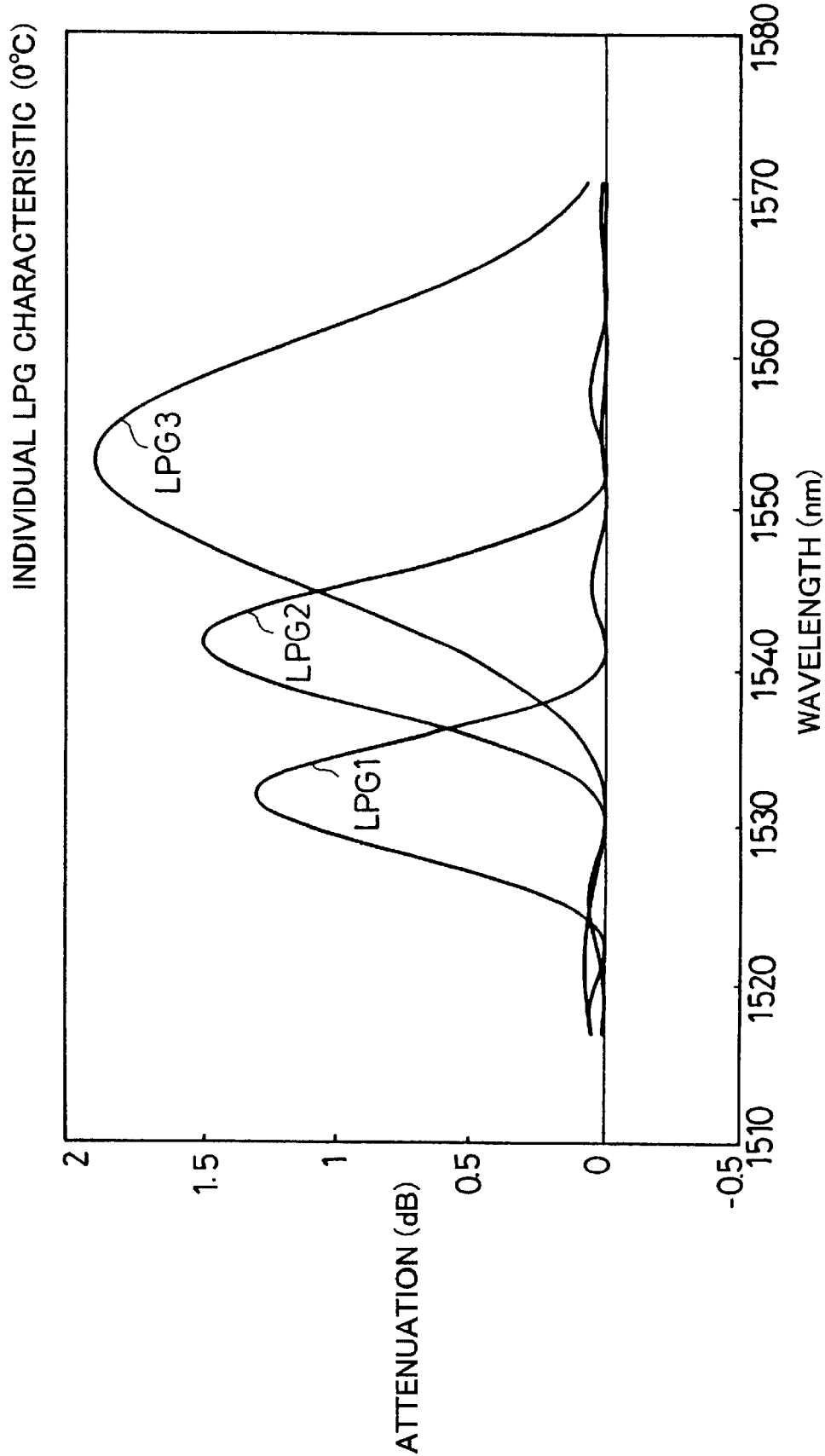
FIG. 13 is a diagram showing characteristics of the respective LPG's 1 to 3 at 0° C., in a gain control unit constituted corresponding to an optical amplifier having a gain wavelength characteristic shown in FIG. 16.

FIG. 13 is a diagram showing characteristics of the respective LPG's 1 to 3 at 0° C., for the gain control unit 10' constituted corresponding to the optical amplifier having the gain wavelength characteristic relative to a temperature change shown in FIG. 16.

Similarly to FIGS. 10 to 12, the LPG 2 has a characteristic fixed relatively to a temperature change (strictly, fluctuates, but does not so fluctuate as LPG 1 and LPG 3) in this gain control unit 10', and the other LPG 1 and LPG 3 have characteristics, respectively, which fluctuate relative to a temperature change. Thus, the gain control unit 10' operates in a manner similar to FIGS. 10 to 12. Shown in Table 1 is an example of the concrete characteristics of LPG's 1 to 3.

TABLE 1

|  | LPG 1 | LPG 2 | LPG 3 |
|---|---|---|---|
| Maximum Loss | 1.3 dB | 1.5 dB | 1.9 dB |
| Temperature Characteristic | 0.062 nm/° C. | 0.013 nm/° C. | 0.062 nm/° C. |
| Central Wavelength | 1531.8 nm | 1541.5 nm | 1553 nm |
| Spreading Width | 19 nm | 22.4 nm | 44 nm |

Note: The spreading width represents a width between a wavelength at a peak value of loss and a wavelength at a zero value of loss.

Figure 14:
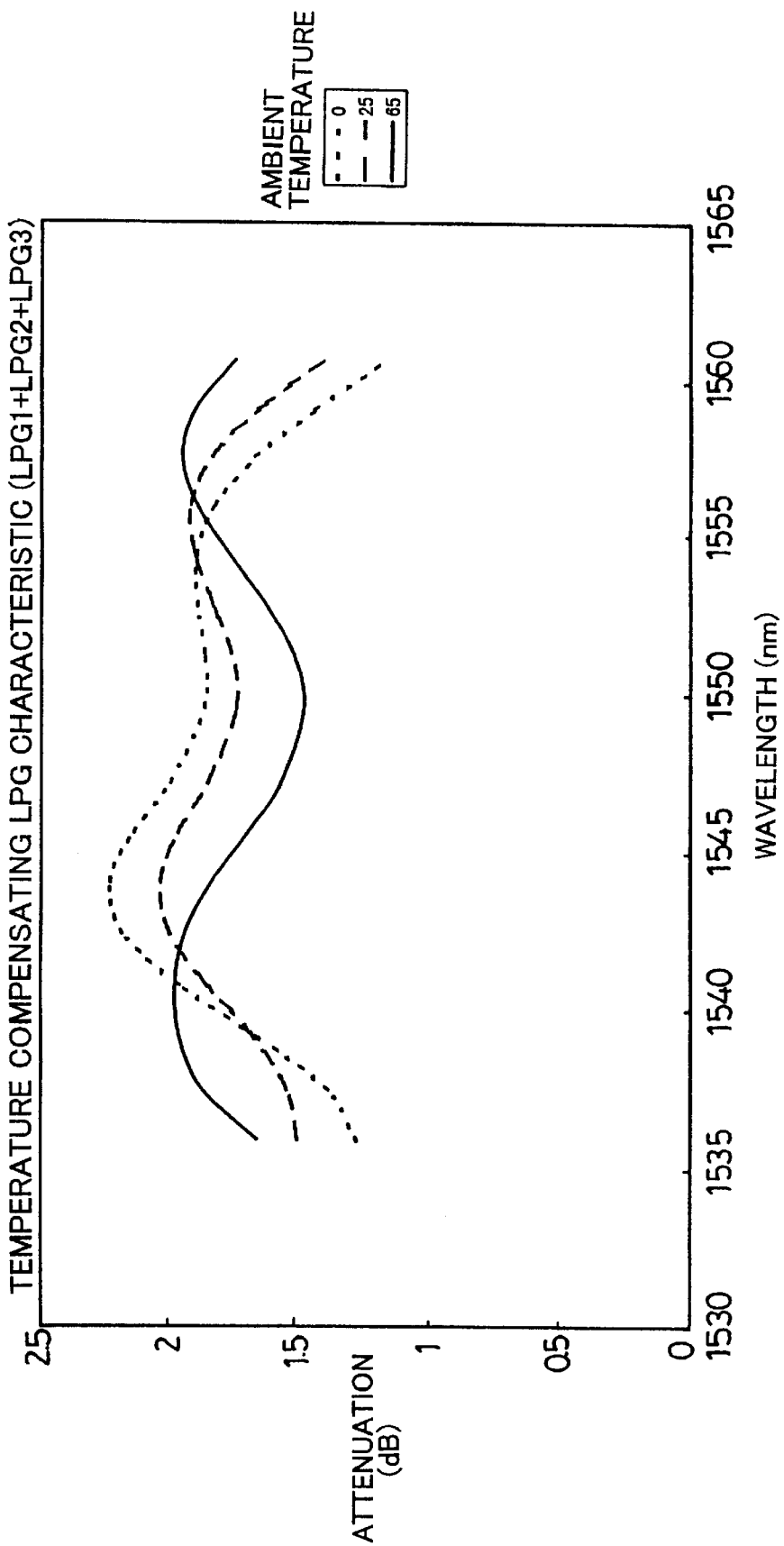
FIG. 14 is a diagram showing loss wavelength characteristics, at respective temperatures, of a gain control unit comprising the LPG's 1 to 3 having the characteristics shown in FIG. 13, respectively.

FIG. 14 is a diagram showing loss wavelength characteristics of the gain control unit 10' comprising LPG's 1 to 3 having characteristics shown in FIG. 13 and Table 1, at 0° C., 25° C. and 65° C., respectively.

Figure 15:
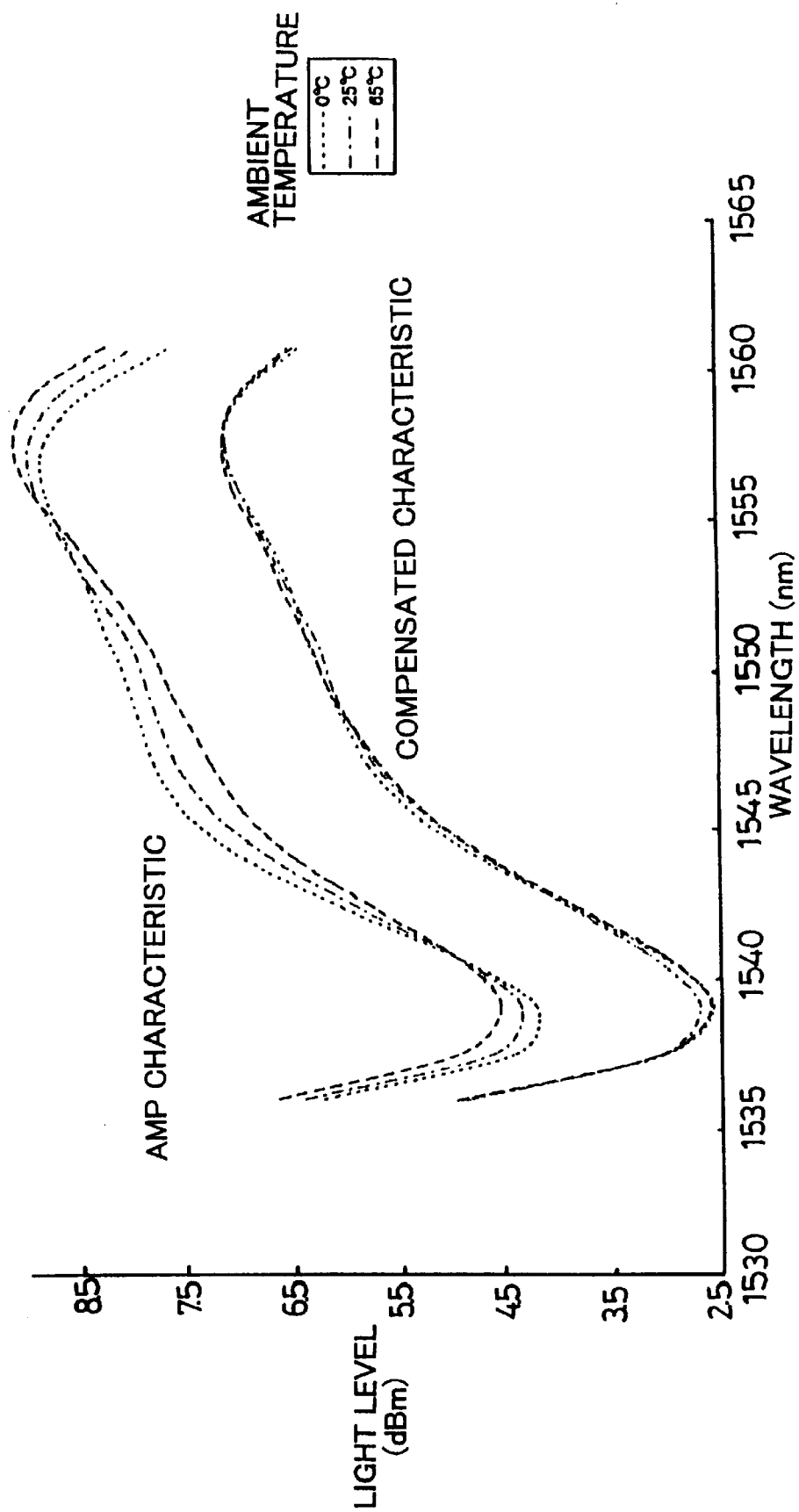
FIG. 15 is a diagram showing wavelength characteristics before and after gain compensation, in case of adopting a gain control unit having the characteristics of FIG. 14.

There is obtained an optical signal which exhibits a compensated wavelength characteristic as shown in FIG. 15, by connecting the gain control unit 10' having such constitutions that the loss wavelength characteristic thereof have the temperature dependency as shown in FIG. 14, to the optical amplifier in a manner similar to the aforementioned FIG. 2 to thereby compensate the gain wavelength characteristics of the optical amplifying portions 21 and 22.

Namely, the optical signal input into the input port IN of the optical amplifier is amplified at the optical amplifying portions 21 and 22, according to the gain wavelength characteristic as shown by the upper side (AMP characteristic) of FIG. 15. As such, the optical signal level after amplification is in itself rendered to have a wavelength characteristic which fluctuates depending on the ambient temperature. Nonetheless, the optical signal is passed through the gain control unit 10' so that the differences among wavelength characteristics relative to temperature differences are compensated to be small as shown by the lower side (compensated characteristic) of FIG. 15. Thus, the optical signal level after compensation by virtue of the gain control unit 10' can be rendered to have wavelength characteristics substantially identical to one another, over a range from a lower temperature (0° C.) to a higher temperature (65° C.).

Further, the compensation errors in case of the compensated characteristic of FIG. 15 are shown as (C) and (D) in an overlapped manner in the aforementioned FIG. 17. As seen from the characteristics (C) and (D) of.FIG. 17, it is apparent that those characteristics in case of adopting the gain control unit 10' constituted by combining the LPG's 1 to 3 are improved as compared to the temperature characteristics by the optical amplifier only.

According to the second embodiment as described above, the gain control unit 10' is constituted by combining the three LPG's 1 to 3 constituted such that the loss wavelength characteristics thereof are mutually different and the respective loss wavelength characteristics have temperature dependencies, corresponding to the gain wavelength characteristic of the optical amplifier. Thus, it becomes possible to assuredly perform the gain compensation at such a wide wavelength band ranging from 1,535 nm to 1,560 nm and over a wide temperature range.

In the aforementioned first and second embodiments, there are shown the gain control unit 10 or 10' inserted at the output side of the latter stage optical amplifying portion 22. However, the arrangement of the gain control unit is not limited thereto. The gain control unit may be inserted at an arbitrary position between the input port IN and output port OUT (such as inclusive of the interior of EDFA constituting the optical amplifying portion). Further, the gain control unit is not limited to be incorporated into an optical amplifier, and may be connected to the optical amplifier from the exterior thereof. Although there has been described a situation where the optical amplifier is constituted in a two stage amplification manner, the present invention is not limited thereto and can be applied to any known optical amplifiers having various amplifying constitutions.

Although there has been described a situation where the gain control unit is constituted by combining two or three LPG's, the present invention is not limited thereto and it is possible to constitute a gain control unit by combining four or more LPG's according to the present invention. Further, although there have been separately arranged LPG's having mutually different characteristics in the optical transmission line L within the gain control unit, it is possible to adopt an application or modification to unite the grating areas, such as by adopting a chirped grating format in which the grating pitch is continuously varied or a multiplexed grating format in which gratings having mutually different grating pitches are overwritten.

Moreover, although there has been described a situation where the fiber grating of long period type is adopted, any type of fiber grating other than the long period type can be adopted as the grating part of the present invention insofar as a desired characteristic can be obtained.

What I claimed are:

1. An optical amplifier having a temperature compensating function, in which said optical amplifier includes means for amplifying an optical signal to be propagated through an optical transmission line, and said means for amplifying an optical signal has a gain wavelength characteristic having a temperature dependency, said optical amplifier comprising:

means for controlling gain having a plurality of grating portions provided within said means for amplifying an optical signal or on said optical transmission line connected to said means for amplifying an optical signal; wherein said plurality of grating portions have mutually different loss wavelength characteristics, and said mutually different loss wavelength characteristics have mutually different temperature dependencies; and wherein said loss wavelength characteristics of said grating portions and said temperature dependencies of said loss wavelength characteristics are set corresponding to the gain wavelength characteristic of said means for amplifying an optical signal and the temperature dependency of said gain wavelength characteristic of said means for amplifying an optical signal, respectively;

means for controlling gain to be constant, which monitors the powers of input light and output light of said means for amplifying an optical signal, and controls operating conditions so that the gain in said means for amplifying an optical signal is constant;

means for variably attenuating an optical signal which variably attenuates an optical signal propagated through said optical transmission line; and means for controlling output power to be constant, which monitors the power of output light of said means for amplifying an optical signal, and controls an amount of light attenuation of said means for variably attenuating an optical signal so that the power of said output light is constant.

2. An optical amplifier having a temperature compensating function as claimed in claim 1, wherein said means for amplifying an optical signal is a multistage amplification constitution having a plurality of optical amplifying portions.

3. An optical amplifier having a temperature compensating function as claimed in claim 2, wherein said means for amplifying an optical signal has a former optical amplifying portion and a latter optical amplifying portion mutually connected in cascade through said means for variably attenuating an optical signal; and wherein said means for controlling gain to be constant has a former portion for controlling gain in said former optical amplifying portion to be constant, and a latter portion for controlling gain in said latter optical amplifying portion to be constant.

4. An optical amplifier having a temperature compensating function as claimed in claim 1, wherein said plurality of grating portions are long period fiber gratings which are formed along said optical transmission line, respectively.

5. An optical amplifier having a temperature compensating function as claimed in claim 4, wherein said long period fiber gratings have respective grating pitches in a range of from 0.1 mm to 1 mm.

6. An temperature compensated optical amplifier having a temperature compensating function as claimed in claim 1, wherein said means for amplifying an optical signal includes an optical fiber amplifier adopting a rare earth element doped fiber.

7. A temperature compensated optical amplifier, comprising:

a temperature sensitive optical amplifier;

a temperature compensating gain controller cascade connected with said temperature sensitive optical amplifier;

an automatic gain control which monitors powers of input light and output light of said temperature sensitive optical amplifier and maintains a constant gain of said temperature sensitive optical amplifier;

a variable optical attenuator which attenuates an optical signal propagated through said temperature compensated optical amplifier; and an automatic level control which monitors light power at an output of said temperature compensated optical amplifier and controls said variable optical attenuator so that the light power at said output is constant.

8. A temperature compensated optical amplifier as claimed in claim 7 wherein said temperature sensitive optical amplifier is a multistage optical amplifier.

9. A temperature compensated optical amplifier as claimed in claim 8, wherein said multistage optical amplifier comprises a first stage optical amplifier and a second stage optical amplifier and said automatic gain controller controls the gain of said first stage independent of the gain of said second stage.

10. A temperature compensated optical amplifier as claimed in claim 7, wherein said a temperature compensating gain controller comprises a plurality of gratings.

11. A temperature compensated optical amplifier as claimed in claim 10, wherein said plurality of gratings are long period fiber gratings which are formed along an optical transmission line.

12. A temperature compensated optical amplifier as claimed in claim 11, wherein said long period fiber gratings have respective grating pitches in a range of from 0.1 to 1 mm.

13. A temperature compensated optical amplifier as claimed in claim 7 wherein said temperature sensitive optical amplifier includes a rare earth element doped fiber.

* * * * *